United States Patent [19]
Curtis et al.

[11] 4,222,317
[45] Sep. 16, 1980

[54] METHOD AND APPARATUS FOR FIELD-DRYING HARVESTED CROPS

[75] Inventors: Joel E. Curtis, Chickasha; Thornton D. Hall, Fort Cobb, both of Okla.

[73] Assignee: Gold Kist, Inc., Atlanta, Ga.

[21] Appl. No.: 2,567

[22] Filed: Jan. 11, 1979

[51] Int. Cl.³ .................................................. A01F 25/08
[52] U.S. Cl. ........................................ 98/56; 34/233; 34/235
[58] Field of Search .................. 98/55, 56, 57; 34/38, 34/93, 218, 232, 233, 235; 280/763, 764; 296/35 A

[56] References Cited

U.S. PATENT DOCUMENTS

| | | | |
|---|---|---|---|
| 130,287 | 8/1872 | Dunbar | 34/233 X |
| 1,660,555 | 2/1928 | Gentslinger | 98/56 |
| 2,439,853 | 4/1948 | Moffett, Jr. | 34/233 |
| 2,442,344 | 6/1948 | Curtis | 34/233 |
| 3,136,240 | 6/1964 | Rabe | 98/55 |
| 3,910,757 | 10/1975 | Taylor et al. | 34/233 X |
| 4,050,163 | 9/1977 | Short | 34/232 X |
| 4,076,299 | 2/1978 | Dalton | 296/35 A |

FOREIGN PATENT DOCUMENTS

| | | | |
|---|---|---|---|
| 108014 | 7/1943 | Switzerland | 34/38 |
| 294383 | 7/1928 | United Kingdom | 98/56 |
| 743880 | 1/1956 | United Kingdom | 34/235 |

*Primary Examiner*—Albert J. Makay
*Assistant Examiner*—Harold Joyce
*Attorney, Agent, or Firm*—Bacon & Thomas

[57] ABSTRACT

Apparatus for field drying harvested crops, particularly peanuts, in the form of an open-topped container having sides, ends and a bottom of wire mesh fine enough to retain the crops. Tubular wire mesh conduits extend inwardly from opposite side walls and terminate inside the container. Pivoted legs support the container above the ground, oriented in a direction to direct natural currents of ambient air into the conduits and through the contained crops. Selectively usable shades and shutters permit shading from direct sunlight and exclusion of air flow or inclement weather.

10 Claims, 10 Drawing Figures

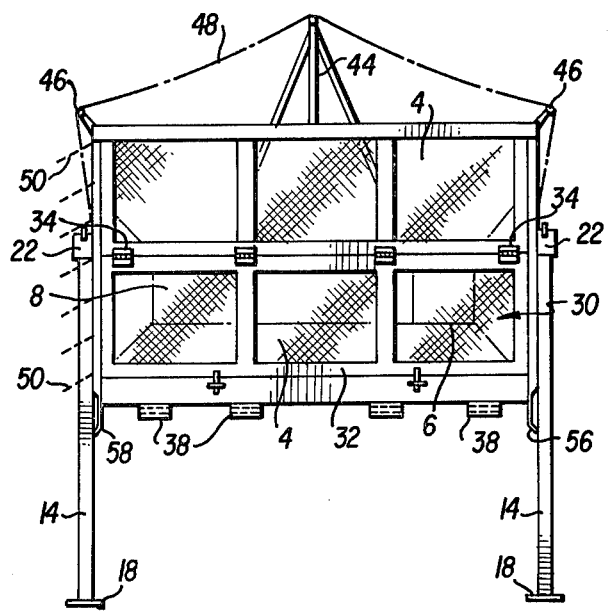
FIG. 3
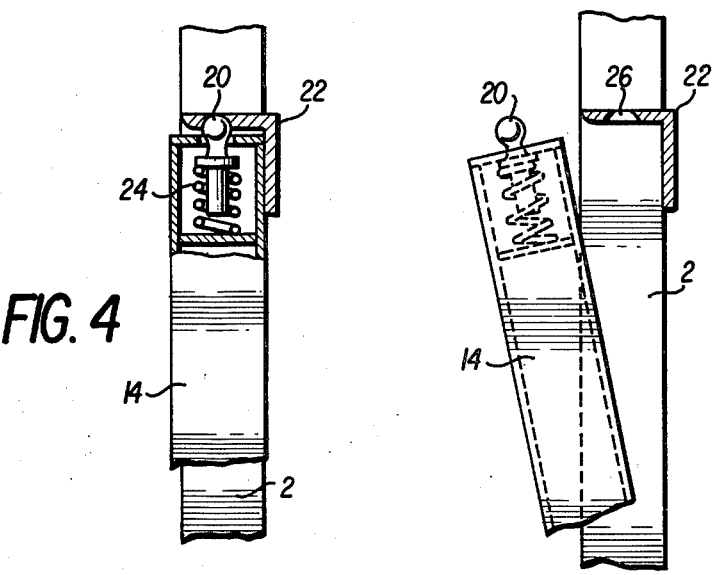
FIG. 4
FIG. 5
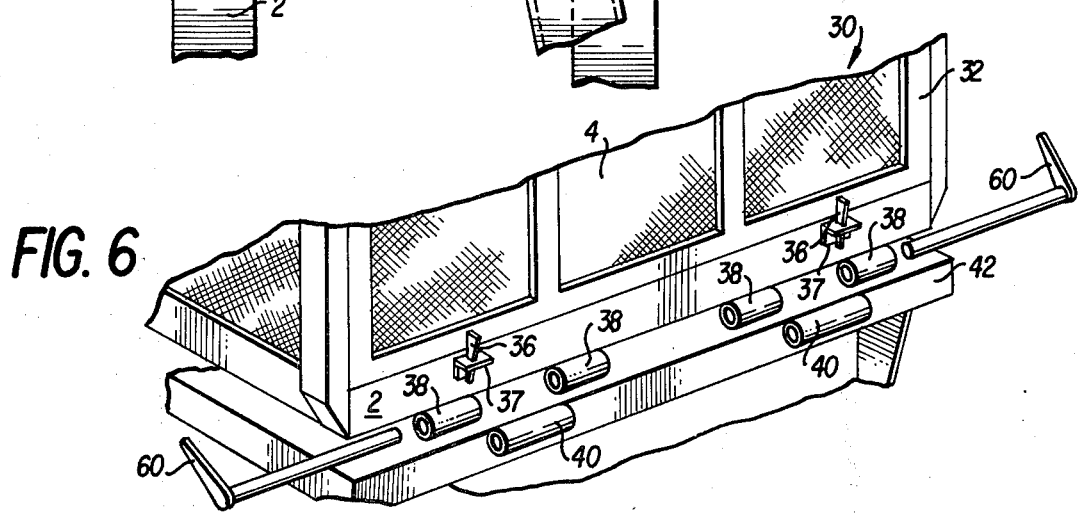
FIG. 6

METHOD AND APPARATUS FOR FIELD-DRYING HARVESTED CROPS

BACKGROUND OF THE INVENTION

This invention is in the field of crop drying apparatus.

Many filed crops, when harvested, are too moist for storage or handling in bulk for further processing. This is paricularly true of peanuts.

A conventional manner of drying harvested peanuts is to place them in burlap sacks and stack or stand the sacks in the field for drying by ambient air. However, such a method has many drawbacks including the necessity of manually handling the sacks and rearranging them in the event of rain. In addition, the sacks are on what may be moist or wet ground and drying by this method may take as much as nine days. Also, the frequent handling of the sacks results in splits and damage to the product.

Another method now widely used is to transport the peanuts to a drying facility where heated air is forced through a bulk body of the product. Such a method involves bulk transport of the moist crop, which often results in their overheating. Such a method is also expensive and conventionally uses gas to heat the air, thus further depleting the available supply of fuel gas.

The patents to Harris U.S. Pat. No. 3,417,487 and Moore U.S. Pat. No. 3,626,601 show representative devices used in forced air drying. Each patent shows a container for holding the product in a bulk body and means for forcibly directing heated air through the body, either from an inner air distributor or from a manifold below the body. In each patent, the body is held in a container or bin having solid side walls.

SUMMARY OF THE INVENTION

The apparatus and method of the present invention is a bin or container having wire mesh or similar foraminous side side walls and bottom. Foraminous conduits extend inwardly from the side walls so the container may be filled in the field and oriented so that prevailing winds or air movement enters the conduits, moves through the contained crop, and escapes through the foraminous side walls, bottom and the open top.

Pivoted legs are provided on the container to hold it spaced above the ground and thus removed from ground moisture or mud. When the product is sufficiently dry a trailer is positioned under the container and connected to it so that forward movement of the trailer causes the legs to pivot, depositing the container on the trailer.

It is further contemplated that means be provided to support a canvas or other shade over the container to prevent direct sunlight from overheating the crop. Also, suitable shutters or the like may be used to stop air flow, and further drying, when the desired moisture content is achieved, usually about 10.5% moisture content for peanuts. Such shade and shutters would also permit protecting a partially dried crop from rain.

It has been found that the method of the present invention will effect drying of peanuts within about 16% of the time for drying by forced air and in from three to five days faster than the sack method referred to above.

During the drying process moisture tends to migrate upwardly and the upper layers of the crop are the most moist. If direct sunlight were permitted to impinge on the moist peanuts, they could become moldy and could form an aflatoxin from aflogilis mold. By shading the drying peanuts, overheating is avoided and evaporative cooling keeps the crop at a safe temperature.

BRIEF DESCRIPTION OF THE DRAWINGS

FIG. 3 is an end elevation of FIG. 1;

FIGS. 4 and 5 are enlarged fragmentary detail views of the leg latches;

FIG. 6 is an enlarged fragmentary view of cooperating features of the apparatus of FIG. 1 and a triler.

DESCRIPTION OF THE PREFERRED EMBODIMENTS

Figures 1, 2:
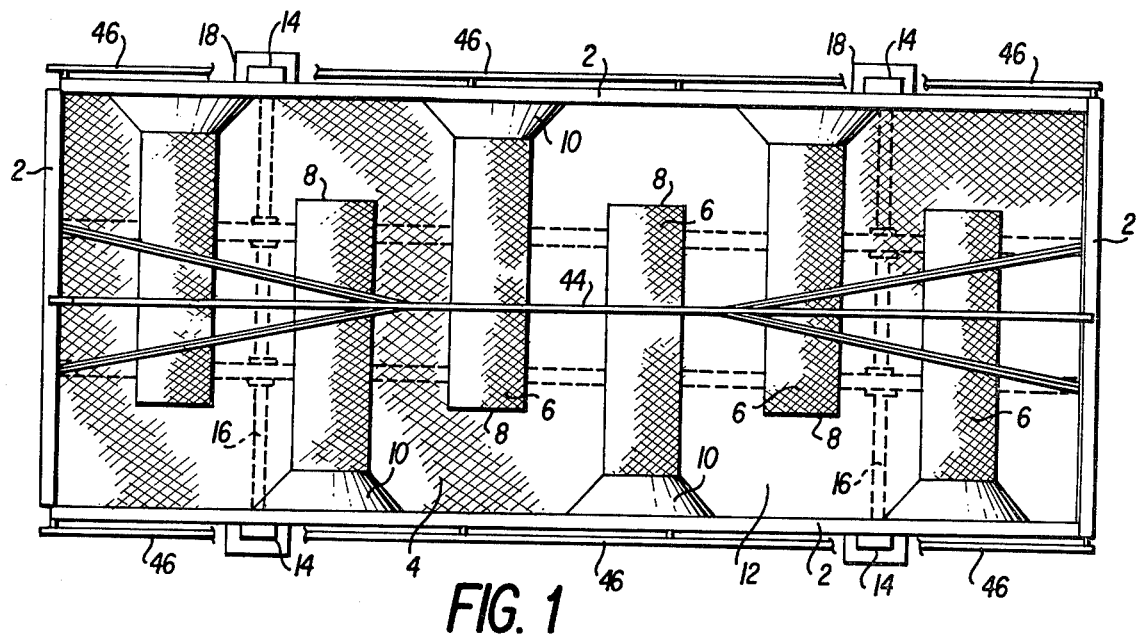
FIG. 1 is a plan view of apparatus embodying the present invention.
FIG. 2 is a side elevation of FIG. 1.

While the description herein referes specifically to the drying and handling of peanuts, it is to be understood that the invention is equally applicable to the drying and handling of other harvested crops.

Referring first to FIGS. 1–6 of the drawings, the apparatus shown comprises a bin or container of generally rectangular shape and having spaced frame bars 2. The sides, ends and bottom of the container are formed of foraminous material 4 which may be in the form of wire mesh, expanded metal, or the like secured to the frame bars to define an open-topped container. The mesh of the material 4 must be sufficiently small to retain the particular crops to be treated but large enough to permit substantially free and unimpeded flow of air therethrough. A plurality of foraminous conduits 6 are shown extending inwardly from opposite side walls of the container, spaced upwardly from the bottom and extending inwardly from alternate side walls to an inner end 8 terminating within the container. As shown, conical air directors 10 define the outermost ends of the conduits 6 which conical directors may be either foraminous material or solid metal. While the conical directors are not essential, it has been found that they increase the flow of air into the conduits by a factor of about four. It is not necessary that the side walls be provided with cutaway portions over the conduits 6 since air can freely pass through the foraminous side walls into those conduits. The inner ends 8 of the conduits 6 may be closed by additional foraminous material of the same material as the side walls or they may be left completely open.

As shown, the conduits 6 extend inwardly from the side walls at a position spaced above the bottom 12 a distance generally of the same order of magnitude as the spacing between the conduits 6 and the conduits thus define a horizontal row extending, alternately, inwardly from opposite side walls of the container.

The container is also provided with supporting legs 14 pivoted to frame members 2 by means of axles 16 to which they are fixed and the legs are provided with suitable supporting feet 18 at their lower ends. The legs 14 extend upwardly beyond axles 16 and are provided at their upper ends with spring pressed latch members 20 (see FIGS. 4 and 5), cooperating with keeper members 22 mounted on adjacent frame members 2. The latch and keeper members illustrated are merely suggestive of means for releasably holding the legs in their upright position for a purpose to be later described. As shown, the latch members 20 are urged upwardly by springs 24 to project their upper ends into retaining sockets 26 of the keepers 22. The legs are also provided, adjacent their lower ends, with short sections of chain 28 by which the legs may be secured to the container when in the tilted position shown in dotted line in FIG. 2, all as will be later described. The end wall 30 of the container is best shown in FIGS. 3 and 6 and comprises a hinged panel 32, hinged intermediate the height of the end wall by hinge means 34 (see FIG. 3) to swing outwardly. The hinged panel is retained in its closed position by suitable keeper members 36, shown in FIG. 6 releasably held in slotted brackets 37 on frame member 2. The lowermost frame member 2 at the rear end of the container, below the hinged panel 32, is provided with hinge loops 38 cooperable with further hinge loops 40 secured to a trailer bed 42, also for a purpose to be later described.

In use, the moist field crops, such as peanuts, are placed in the container to a level substantially above the tops of the conduits 6 to form a bulk body of the product in the container. If the conduits are provided with foraminous ends, the crops cannot enter therein. However, even if the inner ends of the conduits are open, the crops will "bridge" the opening leaving the conduit free for air flow. The legs 14 are placed in their upright position to support the container and product well above the surface of the ground and thus protect the product from ground moisture. The container is oriented or arranged so that at least those conduit openings through side wall are directed toward the prevailing wind or air currents in the region. Thus, the ambient air currents enter the conduits 6 and are diffused outwardly through their foraminous wall, through the body of product to be dried and outwardly of the container through the side wall, ends or bottom wall without substantial restriction. This results in rapid and efficient drying of the crop. It is also contemplated that external scoops or deflectors (not shown) may be provided for directing air currents into the conduits 6.

When drying field crops in this manner, moisture from the body of the product tends to rise toward the top thereof and the upper region of the body, during the drying period, is usually thus more moist than the remainder. In the event ambient temperatures are quite high or if the sun is shining directly on the apparatus, excessive heat in the upper regions of the product will be generated and unwanted mold can form. Among the molds that can form are an aflagilis mold which can produce aflatoxin which would ruin the product for commercial use. To prevent such an occurrence, the container is also provided with a central longitudinal and upstanding truss arrangement 44 (see FIG. 3) and longitudinally extending rails 46 at the upper edges of the side walls. As shown in broken line in FIG. 3, a canvas or tarpaulin cover 48 can be draped over the ftrusswork 44 and rails 46 to protect the product in the container from direct sunlight. The draping of the cover over the truss and side rails directs rain outwardly of the bin contents to prevent undesired wetting. Thus, the evaporative cooling of the product maintains it within a safe temperature range during drying. In tests it was found that evaporative cooling maintained a temperature inside the container from 5° F. to 35° F. cooler than ambient temperature. It is also contemplated that the cover 48 will be provided with openings therethrough to permit escape of heated air which might otherwise be trapped under the cover. In the event such openings are provided, it will be further necessary to arrange spaced covering elements over those openings to exclude rain and direct sunlight.

It is also desirable that the product being dried be protected from rain and that means be provided for terminating the drying process when the desired moisture content of the product has been attained. FIG. 3 shows schematically, at 50, a series of movable louvres or slats that can normally be positioned to extend outwardly and thus permit free flow of air into and through the container but which may be selectively closed in the event of rain or other inclement weather or when the desired moisture content of the product has been attained. As an alternative to the pivoted louvres, solid shutter plates may be positioned over the side and end walls when desired.

Figure 7:
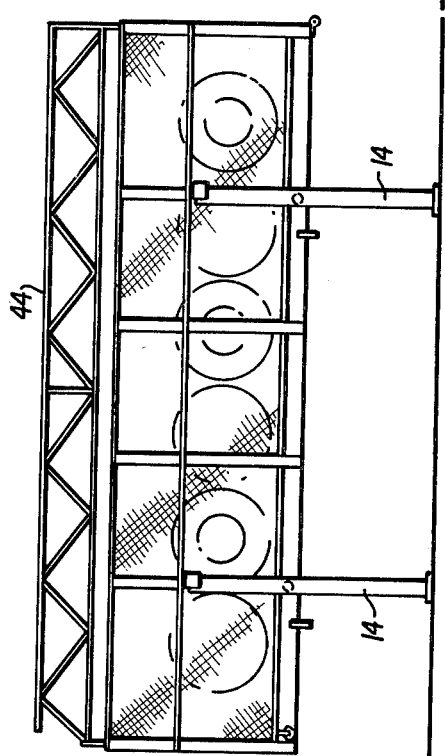
FIGS. 7, 8, 9 and 10 illustrate sequential steps in loading, transporting and dumping the dried peanuts.
Figure 7:
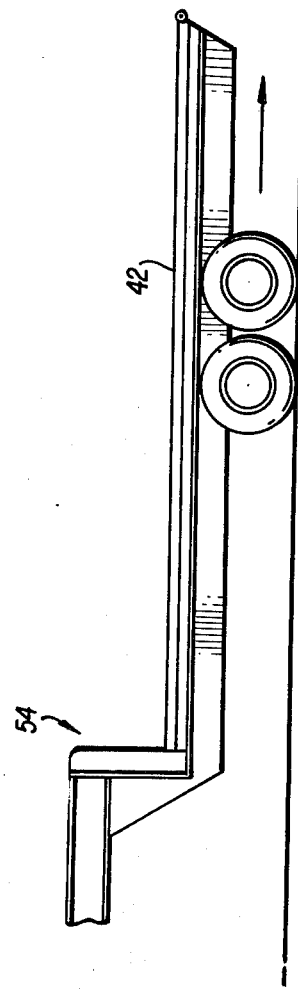
Figure 8:
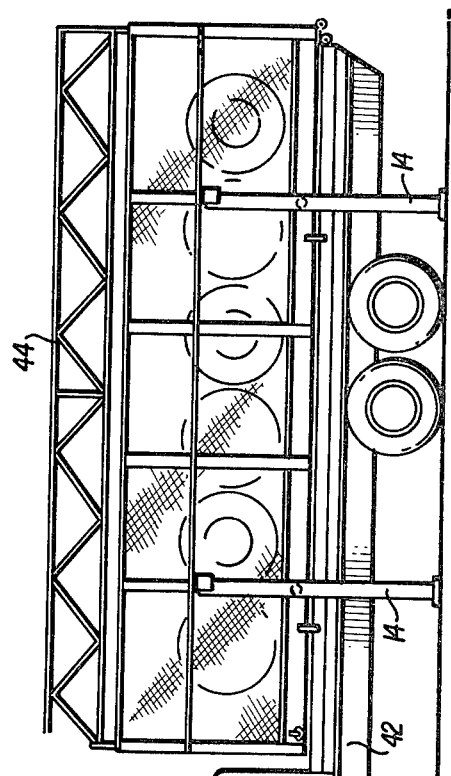
Figure 8:
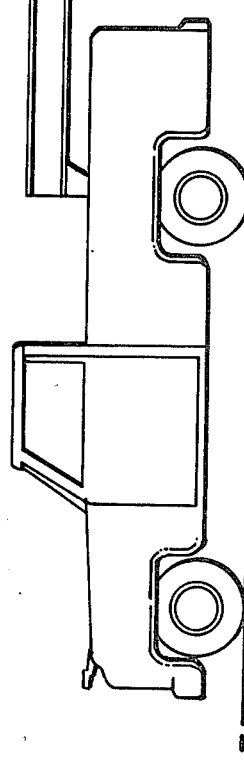
Figure 9:
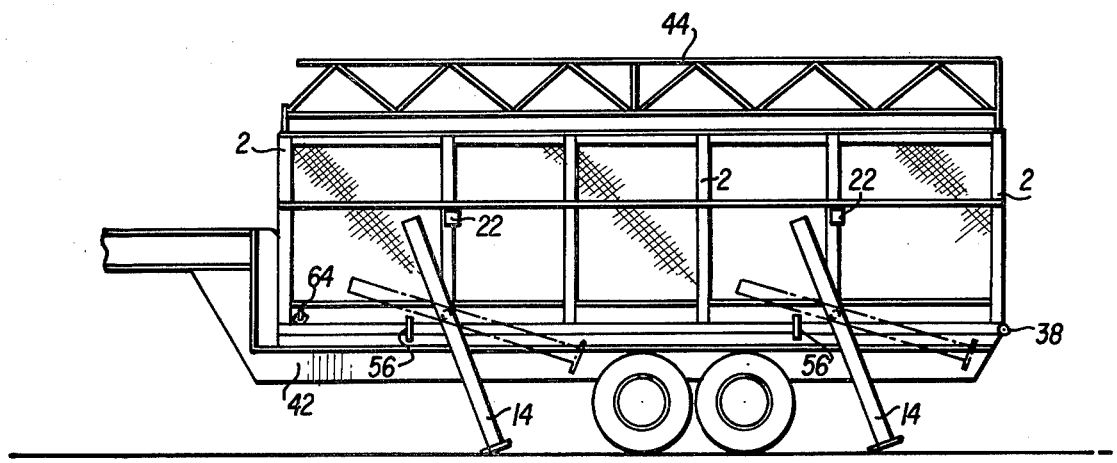
Figure 10:
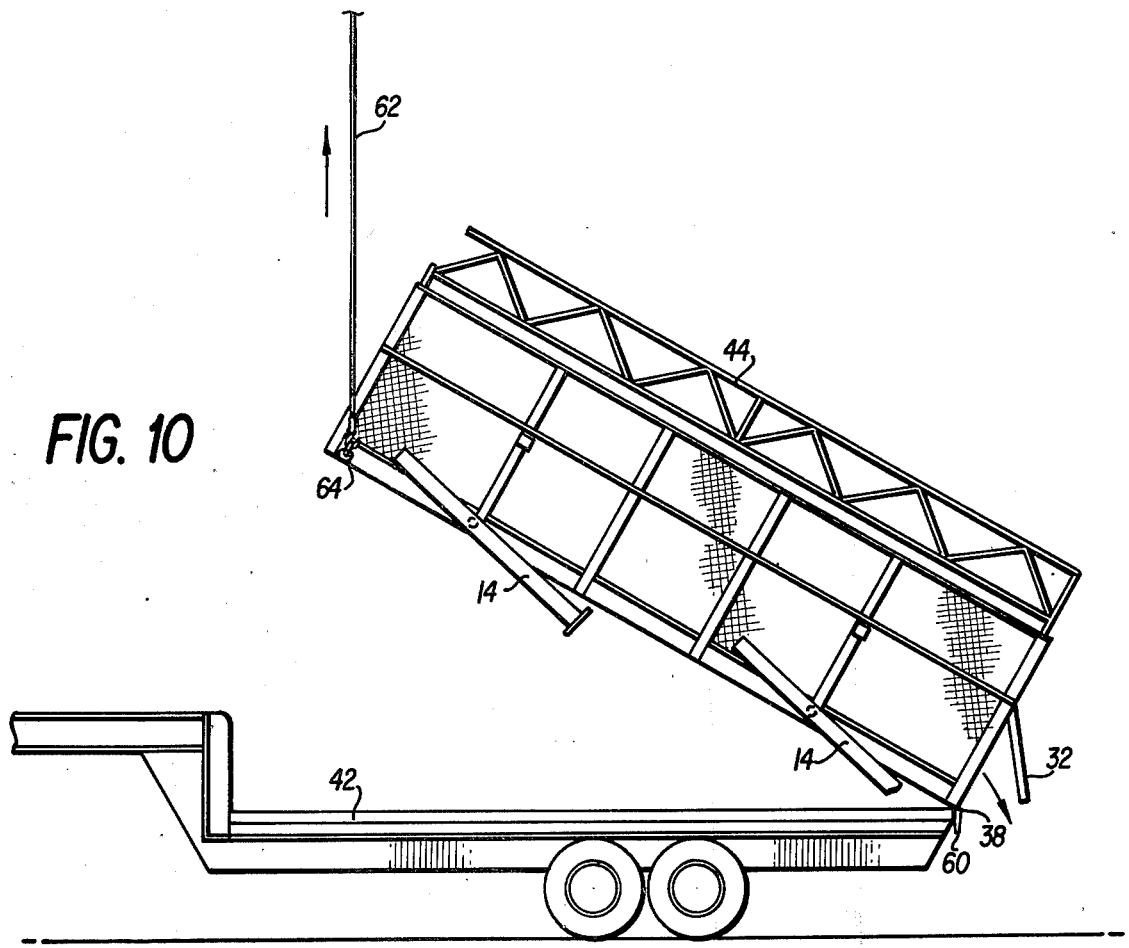

Referring now to FIGS. 7 to 10, when the product in the container has been dried to the desired moisture content, the container is still supported by its legs 14 as shown at 52 in FIG. 7. At this time a suitable trailer 54 may be backed under the container, between legs 14, to position its bed 42 below the container as shown in FIG. 8. At this time any suitable means such as a chain or link will be connected between the trailer and container and the trailer may then be moved forwardly to the left, as seen in FIG. 9. This forward movement of the trailer results in the swinging of legs 14 rearwardly, as seen in FIG. 9, their latches 20 thus disengaging from keepers 22. As is obvious, the forward movement of the container and swinging of the legs as described results in lowering the container onto the trailer bed 42 to the position of FIG. 9. To facilitate proper alignment of the container and trailer bed, the container is provided with guiding elements 56 provided with bevelled lower ends 58 by which the container will be properly aligned with the lateral edges of the trailer bed 42 thus bringing the hinge elements 38 and 40, previously described, into axial alignment, whereupon hinge pins 60 may be projected through the aligned hinge elements to hingedly connect the container to the trailer bed. Also, the legs 14 will then be swung upwardly to the dotted line position of FIG. 2, by manual or other manipulation, and the chains 28 may then be employed to hold the legs in the described upper position for transport.

After the container is thus secured on the trailer bed, the entire assembly is transported to a destination for the dried product. At the destination or delivery station, there will be provided a suitable overhead hoist, crane or the like having a lifting line 62 (FIG. 10) having a hook engageable with suitable loops, rings or the like 64 mounted on the forward portion of the container. The keepers 36 are then removed from brackets 37 and the container is tilted about the axis of hinge elements 38 and 40 whereupon the hinged panel 32 is free to swing to the open position shown in FIG. 10 for gravity discharge of the dried product at the delivery station. Thereupon the container may be again lowered onto the trailer and transported back to the field to receive another load of products to be dried.

By way of example, for drying peanuts, a practical dryer could be 20 feet long, 8 feet wide and 4 feet in height with the side, end and bottom panels of ¼" expanded metal. The conduits and conical directors would be 6 feet long, overall, have a diameter of 18" with the conical directors 36" in diameter and 9" in axial length. The conduits would be about 18" apart and about 2 feet from the bottom. The container should be filled with harvested peanuts to a depth of about 18" above the conduits.

While a single specific embodiment of the invention has been shown and described, it is to be understood that the same is merely illustrative of the principles and that other structural embodiments may be employed within the scope of the invention as defined by the appended claims.

We claim:

1. Apparatus for field drying harvested field crops, comprising:
    an open-topped container having foraminous opposed side and end walls and a foraminous bottom wall;
    a plurality of spaced foraminous conduits defining a first row and extending inwardly from one side wall, spaced upwardly from said bottom wall and having an inner end spaced inwardly from the other side wall;
    other plurality of spaced foraminous conduits defining a second row and extending inwardly from said other side wall, spaced upwardly from said bottom wall and having an inner end spaced inwardly from said one side wall;
    individual conduits of said first row extend and are alternately spaced between said conduits of said second row;
    said foraminous walls, bottom wall, conduit being of a porosity to prevent passage of said field crops therethrough while permitting free and substantially unimpeded flow of air therethrough.

2. Apparatus as defined in claim 1 wherein said side walls, bottom wall and conduit are of wire mesh.

3. Apparatus as defined in claim 1 including a substantially opaque shading cover removably positioned over said open-topped container to shade the interior thereof from direct sunlight.

4. Apparatus as defined in claim 1 wherein said conduits are provided with outwardly flared conical end portions at said side walls.

5. Apparatus as defined in claim 1 including upright supporting legs secured to said container for supporting the same with said bottom wall spaced upwardly from a supporting surface.

6. Apparatus as defined in claim 5 wherein said legs are pivoted to said container on parallel axes, and releasable latch means releasably holding said legs in upright position.

7. Apparatus as defined in claim 6 wherein one of said end walls comprises a hinged panel for discharge of dried crops from said container.

8. Apparatus as defined in claim 1 including foraminous closures closing the inner ends of said conduits.

9. Apparatus as defined in claim 1 wherein the inner ends of said conduits are open, the said open ends being closed when a body of said field crops is placed in said container.

10. Apparatus as defined in claim 1 including means for substantially and selectively closing said foraminous side walls to terminate ambient air flow through said container or to protect the contents thereof from inclement weather.

* * * * *